(12) United States Patent
Bluschke et al.

(10) Patent No.: US 12,294,410 B2
(45) Date of Patent: May 6, 2025

(54) TRIGGER-BASED OPTICAL WIRELESS COMMUNICATION SYSTEM

(71) Applicant: SIGNIFY HOLDING B.V., Eindhoven (NL)

(72) Inventors: Andreas Felix Alfred Bluschke, Eindhoven (NL); Haimin Tao, Eindhoven (NL); Karnekumar Arulandu, Breda (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 303 days.

(21) Appl. No.: 18/014,681

(22) PCT Filed: Jun. 23, 2021

(86) PCT No.: PCT/EP2021/067081
§ 371 (c)(1),
(2) Date: Jan. 5, 2023

(87) PCT Pub. No.: WO2022/008240
PCT Pub. Date: Jan. 13, 2022

(65) Prior Publication Data
US 2023/0224038 A1 Jul. 13, 2023

(30) Foreign Application Priority Data
Jul. 10, 2020 (EP) .................................. 20185227

(51) Int. Cl.
*H04B 10/116* (2013.01)
(52) U.S. Cl.
CPC .................................. *H04B 10/116* (2013.01)
(58) Field of Classification Search
None
See application file for complete search history.

(56) References Cited

U.S. PATENT DOCUMENTS 5,229,593 A * 7/1993 Cato ..................... G02B 3/00
250/551
5,808,760 A * 9/1998 Gfeller ............... H04B 10/1143
398/119

(Continued)

FOREIGN PATENT DOCUMENTS

EP 2737665 B1 3/2016
WO 2017042593 A1 3/2017

(Continued)

OTHER PUBLICATIONS http://www.ieee802.org/802_tutorials/2015-11/PoDL_tutorial_1115.pdf.

(Continued)

*Primary Examiner* — Jai M Lee

(57) ABSTRACT

High-speed optical communication is very attractive to satisfy high throughput applications. In the meanwhile, it is also desirable to reduce the energy waste resulted from an idle state of the optical transceivers of the communication system. The present invention discloses that both the access point (1200) and the end point device (1100) can operate in at least two different operation states, a normal operation state and a low power state. The low power state is a default state, and the normal operation state is enabled only when a valid trigger is detected. To establish a high-speed optical link (60), the end point device (1100) first sends an optical trigger signal (50) to the access point (1200) in the low power state. The access pint (1200) switches to the normal operation state only when a valid trigger signal is identified after detecting the optical trigger signal (50).

13 Claims, 8 Drawing Sheets

(56) References Cited

U.S. PATENT DOCUMENTS

| | | | |
|---|---|---|---|
| 6,525,854 B1* | 2/2003 | Takahashi | H04B 10/1143 398/115 |
| 9,019,895 B2 | 4/2015 | Li et al. | |
| 9,236,948 B2* | 1/2016 | Giessler | H04B 10/40 |
| 9,851,772 B2 | 12/2017 | Dwelley et al. | |
| 9,860,072 B2 | 1/2018 | Gardner et al. | |
| 10,095,257 B2 | 10/2018 | Van Endert | |
| 10,623,098 B2* | 4/2020 | Li | H04W 88/08 |
| 11,601,197 B2* | 3/2023 | Featherston | H04B 10/40 |
| 11,689,284 B2* | 6/2023 | Seyvet | H04B 10/116 398/118 |
| 2009/0310971 A1* | 12/2009 | Kim | H04W 28/16 398/103 |
| 2014/0193161 A1* | 7/2014 | In De Betou | H04L 7/02 398/154 |
| 2016/0020912 A1* | 1/2016 | Charbonneau-Lefort | H04B 10/40 398/139 |
| 2017/0033886 A1* | 2/2017 | Tada | H04L 43/0894 |
| 2017/0034779 A1 | 2/2017 | Huang | |
| 2017/0207851 A1* | 7/2017 | Zeng | H04B 10/116 |

FOREIGN PATENT DOCUMENTS

| | | |
|---|---|---|
| WO | 2018125761 A1 | 7/2018 |
| WO | 2018234101 A1 | 12/2018 |
| WO | 2019016024 A1 | 1/2019 |
| WO | 2019111018 A1 | 6/2019 |

OTHER PUBLICATIONS https://www.androidauthority.com/phones-with-ir-blaster-858845/.
https://www.nxp.com/docs/en/data-sheet/TJA1100.pdf.
https://www.google.nl/url?sa=t&rct=j&q=&esrc=s&source=web&cd=1&ved=2ahUKEwirsuOw-cTnAhVEKewKHXbqBNgQFjAAegQIARAB&url=http%3A%2F%2Fwww.opensig.org%2Fdownload%2Fdocument%2F220%2FTC10%2BWake-up%2Band%2BSleep%2BSpecification%2Bfor%2BAutomotive%2BEthernet_11-2017pdf&usg=AOvVaw0kkj-6te6r0r718bria8Nk.
https://assets.vector.com/cms/content/events/2019/vAES19/vAES19_02_Sporer_NXP.pdf.
https://mentor.ieee.org/802.11/dcn/19/11-19-1208-00-00bb-practical-experiences-in-implementing-an-lc-optimized-phy-proposed-for-tgbb.ppt.

* cited by examiner

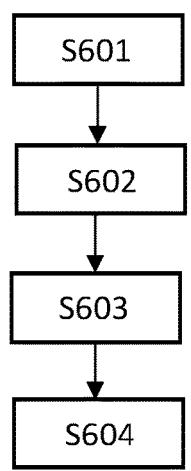
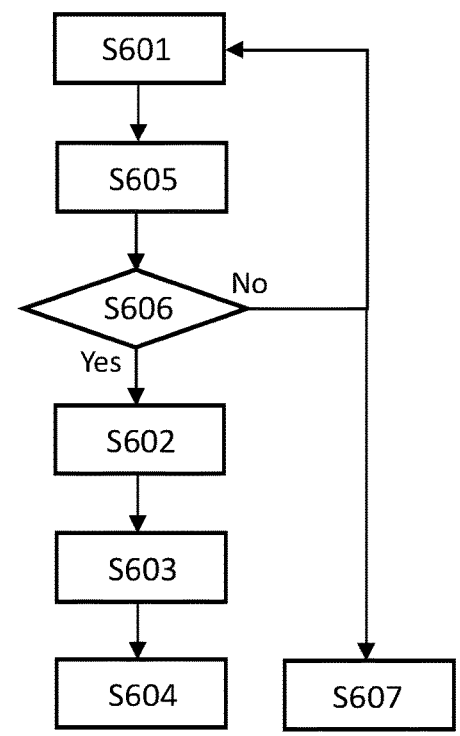
FIG. 14                    FIG. 15

TRIGGER-BASED OPTICAL WIRELESS COMMUNICATION SYSTEM

CROSS-REFERENCE TO PRIOR APPLICATIONS

This application is the U.S. National Phase application under 35 U.S.C. § 371 of International Application No. PCT/EP2021/067081, filed on Jun. 23, 2021, which claims the benefit of European Patent application Ser. No. 20/185,227.4, filed on Jul. 10, 2020. These applications are hereby incorporated by reference herein.

FIELD OF THE INVENTION

The invention relates to the field of optical wireless systems, such as Li-Fi networks. More particularly, various methods, apparatus, systems, and computer-readable media are disclosed herein related to a trigger-based optical wireless communication system with at least two operation states.

BACKGROUND OF THE INVENTION

To enable more and more electronic devices like laptops, tablets, and smartphones to connect wirelessly to the Internet, wireless communication confronts unprecedented requirements on data rates and also link qualities, and such requirements keep on growing year over year, considering the emerging digital revolution related to Internet-of-Things (IoT). Radio frequency technology like Wi-Fi has limited spectrum capacity to embrace this revolution. In the meanwhile, light fidelity (Li-Fi) is drawing more and more attention with its intrinsic security enhancement and capability to support higher data rates over the available bandwidth in visible light, Ultraviolet (UV), and Infrared (IR) spectra. Furthermore, Li-Fi is directional and shielded by light blocking materials, which provides it with the potential to deploy a larger number of access points in a set area, as compared to Wi-Fi, by spatially reusing the same bandwidth. These key advantages over wireless radio frequency communication make Li-Fi a promising solution to mitigate the pressure on the crowded radio spectrum for IoT applications. Other benefits of Li-Fi include guaranteed bandwidth for certain users, and the ability to function safely in areas otherwise susceptible to electromagnetic interference. Therefore, Li-Fi is a very promising technology to enable the next generation of immersive connectivity.

There are several related terminologies in the area of lighting-based communication. Visible-light communication (VLC) transmits data by intensity modulating optical sources, such as light emitting diodes (LEDs) and laser diodes (LDs), faster than the persistence of the human eye. VLC is often used to embed a signal in the light emitted by an illumination source such as an everyday luminaire, e.g. room lighting or outdoor lighting, thus allowing use of the illumination from the luminaires as a carrier of information. The light may thus comprise both a visible illumination contribution for illuminating a target environment such as a room (typically the primary purpose of the light), and an embedded signal for providing information into the environment (typically considered a secondary function of the light). In such cases, the modulation will typically be performed at a high enough frequency to be beyond human perception, or at least such that any visible temporal light artefacts (e.g. flicker and/or strobe artefacts) are weak enough and/or at sufficiently high frequencies so as to be imperceptible or at least tolerable to humans. Thus, the embedded signal does not affect the primary illumination function, i.e., so the user only perceives the overall illumination and not the effect of the data being modulated into that illumination.

The IEEE 802.15.7 visible-light communication personal area network (VPAN) standard maps the intended applications to four topologies: peer-to-peer, star, broadcast and coordinated. Optical Wireless PAN (OWPAN) is a more generic term than VPAN also allowing invisible light, such as UV and IR, for communication. Li-Fi is generally accepted as a species of optical wireless communications (OWC) technology, which makes use of the light spectrum in a broad sense to support bi-directional data communication.

In a Li-Fi system, the signal is embedded by modulating a property of the light, typically the intensity, according to any of a variety of suitable modulation techniques. For communication at high speed, often Infrared (IR) rather than visible light communication is used. Although the ultraviolet and infrared radiation is not visible to the human eye, the technology for utilizing these regions of the spectra is similar, although variations may occur as a result of wavelength dependencies, such as in the case of refractive indices. In many instances there are advantages to using ultraviolet and/or infrared as these frequency ranges are not visible to the human eye, and more flexibility can be introduced in the system. Of course, ultraviolet quanta have higher energy levels compared to those of infrared and/or visible light, which in turn may render use of ultraviolet light undesirable in certain circumstances.

Based on the modulations, the information in the light can be detected using any suitable light sensor. For example, the light sensor may be a photodiode. The light sensor may be a dedicated photocell (point detector), an array of photocells possibly with a lens, reflector, diffuser or phosphor converter (for lower speeds), or an array of photocells (pixels) and a lens for forming an image on the array. E.g., the light sensor may be a dedicated photocell included in a dongle which plugs into a user device such as a smartphone, tablet or laptop, or the sensor may be integrated and or dual-purpose, such as an array of infrared detectors initially designed for 3D face recognition. Either way this may enable an application running on the user device to receive data via the light.

WO2019111018A1 is related to an optical wireless communication (OWC) receiver comprising a photodetector device configured to receive light and to produce a detection signal in response to the received light; receiver circuitry configured to receive and process the detection signal to produce a receiver signal; wake-up circuitry configured to monitor output from the photodetector device or the receiver circuitry, for a predetermined frequency or range of frequencies, and in response to the monitored output being indicative that the received light represents an OWC signal performing a wake-up procedure to move at least the signal processing circuitry from a first, lower power state to a second, higher-power state.

WO2017042593A1 is related to a method for communication in an optical wireless network that comprises a first device, a plurality of further devices, and a common communication channel usable by any one of the further devices for sending data to the first device.

SUMMARY OF THE INVENTION

Improved energy efficiency is always desirable with regard to either economic consideration or the positive contribution to a green environment. However, solutions that provide energy efficiency enhancements also often result in system performance degradation. For example, one way to reduce the energy consumption of an access point may be implemented via duty cycling control, which means the access point is turned on and off periodically. The penalty of this method is that the average latency of an end point device to get connected to the access point will increase correspondingly. Thus, it is recognized by the inventors that a tradeoff between energy efficiency and system performance is needed in designing the optical wireless communication system.

In view of the above, the present disclosure is directed to methods, apparatus, systems, computer program and computer-readable media for providing a mechanism to avoid the waste of energy consumption of an optical wireless communication system.

Accordingly, in order to improve the energy efficiency of the access point and/or the end point device for establishing a high-speed optical communication link, the access point and/or the end point device are configured to operate in at least two operation states. The presence of the end point device is required to trigger the access point to switch from a low power state to a normal operation state, and vice versa. A balance between energy efficiency and access latency is provided in this manner.

In accordance with a first aspect of the invention a method of an access point is provided. A method for operating an access point in an optical wireless communication network, the method comprising the access point: operating in a low power state for detecting a first optical signal from an end point device on a first optical channel; generating a trigger signal after detecting the first optical signal; switching from the low power state to a normal operation state based on the generated trigger signal; operating in the normal operation state for establishing a high-speed optical data link with the end point device; switching back to the low power state from the normal operation state when there is no active high-speed optical data link with any end point device for a predefined period of time; and wherein the access point dissipates less power in the low power state than in the normal operation state, and the high-speed optical data link is established on an optical data channel different from the first optical channel.

Beneficially, the access point operates in at least two different states, the low power state, and the normal operation state. In the low power state, the access point is not capable of supporting a high-speed optical data link, but mainly operating in a detection mode to detect the presence of the end point device. Instead of using a dedicated presence sensor, such as a PIR sensor or a microwave sensor, to detect the motion or presence of a user who is holding the end point device, the presence of the end point device is detected upon receiving the first optical signal from the end point device. The first optical signal may also comprise an identification information of the end point device, and hence the access point may also judge if the end point device is a trusted device to get accessed to the optical network.

Considering different scenarios where the presence of a user is confirmed but there is no such an end point device, or there is an end point device without immediate need to establish the high-speed optical data link, the access point may be triggered to switch to the normal operation mode wrongly, which results in unnecessary energy consumption. In the present invention, the first optical signal is used to submit a clear request from the end point device to trigger the access point to switch to the normal operation mode.

The access point gets into the normal operation state on an on-demand basis. When there is no active high-speed optical data link with any end point device for a predefined period of time, the access point goes back to the low power state as a default state. The predefined period of time may be a preset value by a manufacturer, by a user, or by the device itself. The value may be determined according to an application scenario, a requirement related to performance or user experience, or an expectation on power saving. The longer the predefined period of time, the less efficient in view of energy consumption, but also the less impact on the data communication performance.

Advantageously, prior to generating the trigger signal, the method further comprises the access point negotiating on a setting for the high-speed optical data link with the end point device on the first optical channel upon the detection of the first optical signal; and wherein the step of generating the trigger signal follows after a setting for the high-speed optical data link is agreed between the access point and the end point device.

It is one option that the valid trigger signal is identified immediately from the detected first optical signal, such that the access point may try to serve any end point device that is capable to send the first optical signal over the first optical channel. Alternatively, the access point and end point device may also use low power and low data rate communication on the first optical channel to exchange signaling information to prepare for the high-speed data link. In a preferred example, the access point and the end point device may negotiate on a setting for the high-speed optical data link, and a valid trigger signal is only identified after a setting for the high-speed optical data link is agreed between the access point and the end point device. The setting may be related to a data rate, a bandwidth, a data channel index, a modulation or coding scheme to be used for the high-speed optical data link. The setting may also be related to a time schedule, such that the access point and the end point device agree upon a delay before establishing the high-speed optical data link. Thus, the access point may not switch to the normal operation mode immediately, but according to the time schedule.

In a preferred setup, the low power state of the access point is achieved by disabling a hardware component or disabling a hardware component and enabling a different hardware component in the access point.

In one option, the access point disables at least one hardware component when switching from the normal operation state to the low power state. In another option, different hardware components are used in the normal operation state and the low power state. And hence, when switching from the normal operation state to the low power state, a first hardware component or a first set of hardware components related to the normal operation state are disabled, and a second hardware component or a second set of hardware components related to the low power state are enabled. In a further option, the same set of hardware components are used in both states, and the lower power dissipation in the low power state is achieved via a different configuration, such as lower bias current, lower clock speed, and etc.

In one example, the first optical signal is an infrared signal.

Advantageous, the first optical signal is a narrow band infrared signal. And thus, transmitting and receiving such a narrow band signal can be very power efficient.

In another example, the method further comprises the access point switching between the low power state and a sleep state upon reception of a second trigger signal from another access point; and wherein the access point dissipates less power in the sleep state than in the low power state.

In addition to the control of power states related to the presence of an end device, the access point may also adjust its power state according to a second trigger signal from another access point. Preferably, to further reduce energy consumption, the access point may switch to and from the sleep state upon reception of the second trigger signal. In the sleep state, the access point is not able to detect the presence of an end device but relies on the other access point to provide the second trigger signal to wake up from the sleep state to the low power state. Thus, the sleep state is similar to a power-off state, in which the access point is only responsive to the second trigger signal and also other functions may be, or preferably are, disabled.

The second trigger signal may be arranged according to a certain schedule or may be triggered by an event at the other access point. In one example, the other access point operating in the low power state may first send the second trigger signal to the access point to request it to enter into sleep state; and then upon detection of the presence of an end point device, the other access point may send another second trigger signal to wake up the access point to enter into the low power state in case of handover of the end point device. In this example, the other access point may be located close to the entrance of the room, and thus obtaining the presence information earlier.

Preferably, the access point is a slave access point, and the other access point from which the second trigger signal is received is a master access point.

Depending on the deployment, the master access point may connect to more than one slave access point, such as following a daisy chain configuration. The master access point may also have more advanced presence detection capability. In one example, by knowing the potential trajectory of the end point device, the master access point may send the second trigger signals to slave access points in a selectively manner.

In a preferred setup, the slave access point is connected to a backbone network via the master access point.

The master access point may comprise an interface to the backbone network, such as an Ethernet switch, and all the connected slave access points are connected to the backbone network via the same Ethernet switch.

In another preferred setup, the slave access point is powered from the master access point.

It can be very convenient from the system deployment perspective that a slave access point is powered from the master access point. More advantageously, this setup can be combined with the previous setup, such that using Power-over-Ethernet (PoE) technology to provide data and power via the same twisted pair Ethernet cabling. And hence, the master access point is further configured to operate as a power sourcing equipment (PSE), and the slave access point is configured to operate as a powered device (PD). Different power classes are supported by the PoE standard, and thus the master access point may control the power delivery to the slave access point according to its operating state.

In accordance with a second aspect of the invention a method of an end point device is provided. A method for operating an end point device in an optical wireless communication network comprises the end point device: operating in a low power state for sending a first optical signal on a first optical channel; switching from the low power state to a normal operation state after sending the first optical signal; operating in the normal operation state for establishing a high-speed optical data link with an access point; switching from the normal operation state to the low power state when there is no immediate need for the high-speed optical link; and wherein the end point device dissipates less power in the low power state than in the normal operation state; and wherein the high-speed optical data link is established on an optical data channel different from the first optical channel.

In another example, when there is no immediate need for the high-speed optical link, the end point device may switch from the normal operation state either to the low power state or to a sleep state; wherein the end point device dissipates less power in the sleep state than in the low power state.

To establish the high-speed optical data link with an access point, the end point device takes the initiative to send a first optical signal to the access point, for example in case that the access point is not in normal operation state. Considering that very limited information to be conveyed in such a wakeup signal, the first optical signal is of low data rate and narrow bandwidth and is sent in the low power state of the end point device. The low power state is a default state of the end point device. After sending the first optical signal, the end point device then switches to the normal operation state for establishing the high-speed optical data link. When there is no immediate need to carry out the high-speed link, the end point device switches back to the low power state, or a sleep state to further reduce energy consumption. The decision on switching to either the low power state or the sleep state may depend on an application profile, a user preference, or the battery status of the end point device.

To switch back from the sleep state to the low power state may be triggered by a user command, a scheduled event, or a request from an application, such as a request to send or to receive application data over the high-speed optical link.

Advantageously, after sending the first optical signal and before switching to the normal operation state, the method further comprises the end point device: negotiating on a setting for the high-speed optical data link with the access point on the first optical channel; determining to switch to a normal operation state after a setting for the high-speed optical data link is agreed between the access point and the end point device.

In one example, when no setting for the high-speed optical data link could be agreed between the access point and the end point device, the method further comprises the end point device either remaining in the low power state for sending a second optical signal on the first optical channel; or switching from the low power state to a sleep state.

It may happen that the end point device has a need to establish the high-speed optical data link, but no agreement has been made with the access point. For example, the required data rate cannot be satisfied due to an expected bad channel condition on an optical data channel, which may be derived from the channel quality on the first optical channel. The end point device may keep on sending further optical wakeup signals to initiate a new negotiation. Since the end point device may also roam around in the area, the channel condition between the end point device and the access point may get improved in the meanwhile, or the end point device may approach another access point. in that sense, the end point device may have a better chance to establish the high-speed data link.

In accordance with a third aspect of the invention an access point is provided. An access point in an optical wireless communication network, the access point comprises an optical transceiver comprising one or more optical front ends; a power management unit and a controller; and wherein the access point is configured to implement any one of the methods of the access point according to the present invention.

In a first setup of the access point, the access point has two dedicated optical front ends, a first optical front end for the narrow band first optical channel and a second optical front end for the wide band optical data channel. A same baseband module, or modem, may be shared by the two optical front ends. Different settings of the modem may be applied when operating on different channels, leading to different processing speeds and also power consumption levels. The controller is configured to apply different settings to the baseband module in accordance to a current operating state.

In a second setup, the access point has two dedicated optical transceivers, each comprising an optical front-end module and a modem. The first optical transceiver may be a low power narrow band IR transceiver, which carries out the low data rate communication on the first optical channel. The second optical transceiver may be a high power and high-performance transceiver used for the data communication. Preferably, the second optical transceiver further comprises a LED or vertical-cavity surface-emitting laser (VCSEL) front end.

In a third setup, the access point may only have a single optical transceiver. Different operation states are achieved via a different configuration setting.

Different setups may be adopted with a balance between power efficiency, form factor of the device, and/or hardware cost.

As one example, the access point comprises: a first optical receiver configured to operate in a low power state of the access point for detecting a first optical signal from an end point device on a first optical channel; an optical transceiver configured to operate in a normal operation state of the access point for establishing a high-speed optical data link with the end point device; a controller configured to determine if the access point is to operate in the low power state or the normal operation state; and a power management unit configured to control power supply to the optical transceiver according to the determination of the controller; wherein the first optical receiver is further configured to generate a trigger signal after the first optical signal is detected; and the controller is further configured to determine a switch from the low power state to the normal operation state upon the generation of the trigger signal; determine a switch from the normal operation state to the low power state when there is no active high-speed optical data link with any end point device for a predefined period of time; and wherein the access point dissipates less power in the low power state than in the normal operation state, and the high-speed optical data link is established on an optical data channel different from the first optical channel.

In this example, a dedicated first optical receiver is employed for receiving on the first optical channel. as compared to the optical transceiver for data link, the first optical receiver is of much lower power consumption with low data rate reception capability.

In another example, the access point comprises an optical transceiver configured to operate in a normal operation state of the access point for establishing a high-speed optical data link with an end point device; operate in a low power state of the access point, by disabling a hardware component or disabling a hardware component and enabling a different hardware of the optical transceiver, for detecting a first optical signal from the end point device on a first optical channel. A controller configured to determine if the access point is to operate in the low power state or the normal operation state; and a power management unit configured to control power supply to the optical transceiver according to the determination of the controller. The optical transceiver is further configured to generate a trigger signal after the first optical signal is detected in the low power state of the access point; and the controller is further configured to determine a switch from the low power state to the normal operation state upon the generation of the trigger signal; determine a switch from the normal operation state to the low power state when there is no active high-speed optical data link with any end point device for a predefined period of time; and wherein the access point dissipates less power in the low power state than in the normal operation state, and the high-speed optical data link is established on an optical data channel different from the first optical channel.

In accordance with a fourth aspect of the invention an end point device is provided. An end point device in an optical wireless communication network, the end point device comprises an optical transceiver comprising one or more optical front ends; a power management unit and a controller; and wherein the end point device is configured to implement any one of the methods of the end point device according to the present invention.

Similar to the access point, the end point device may also be implemented via different setups. Note that the end point device may have a stricter requirement on power efficiency, form factor, and/or cost than the access point. Thus, a different setup may be adopted by the end point device rather than the setup adopted by the access point.

In one example of the end point device, the end point device comprises a first optical transmitter configured to operate in a low power state of the end point device for sending a first optical signal on a first optical channel; an optical transceiver configured to operate in a normal operation state of the end point device for establishing a high-speed optical data link with an access point; a controller configured to determine if the end point device is to operate in the low power state, or the normal operation state; and a power management unit configured to control power supply to the optical transceiver according to the determination of the controller; and wherein the controller is further configured to determine a switch from the low power state to the normal operation state after the first low power optical transmitter sending the first optical signal; determine a switch from the normal operation state to the low power state when there is no immediate need for the high-speed optical link. The end point device dissipates less power in the low power state than in the normal operation state; and wherein the high-speed optical data link is established on an optical data channel different from the first optical channel.

In another example of the end point device, the end point device comprises an optical transceiver configured to operate in a normal operation state of the end point device for establishing a high-speed optical data link with an access point; the optical transceiver is further configured to operate in a low power state of the end point device, by disabling a hardware component or disabling a hardware component and enabling a different hardware of the optical transceiver, for sending a first optical signal on a first optical channel; a controller configured to determine if the end point device is to operate in the low power state, or the normal operation state; and a power management unit configured to control power supply to the optical transceiver according to the determination of the controller; and wherein the controller is further configured to determine a switch from the low power state to the normal operation state after the first low power optical transmitter sending the first optical signal; determine a switch from the normal operation state to the low power state when there is no immediate need for the high-speed optical link. The end point device dissipates less power in the low power state than in the normal operation state, and wherein the high-speed optical data link is established on an optical data channel different from the first optical channel.

In accordance with a fifth aspect of the invention an optical wireless communication network is provided. The optical wireless communication network comprises at least one access point according to the present invention, and at least one end point device according to the present invention.

The invention may further be embodied in a computer program comprising code means which, when the program is executed by an access point comprising processing means, cause the processing means of the access point to perform any one of the methods according to the present invention.

The invention may further be embodied in a computer program comprising code means which, when the program is executed by an end point device comprising processing means, cause the processing means of the end point device to perform any one of the methods according to the present invention.

BRIEF DESCRIPTION OF THE DRAWINGS

In the drawings, reference characters generally refer to the same parts throughout the different figures. Also, the drawings are not necessarily to scale, emphasis instead generally being placed upon illustrating the principles of the invention.

FIG. 14 shows a flow chart of a method for operating an end point device in an optical wireless communication network; and FIG. 15 shows a flow chart of another embodiment of the method for operating an end point device in an optical wireless communication network.

DETAILED DESCRIPTION OF EMBODIMENTS

Figure 1:
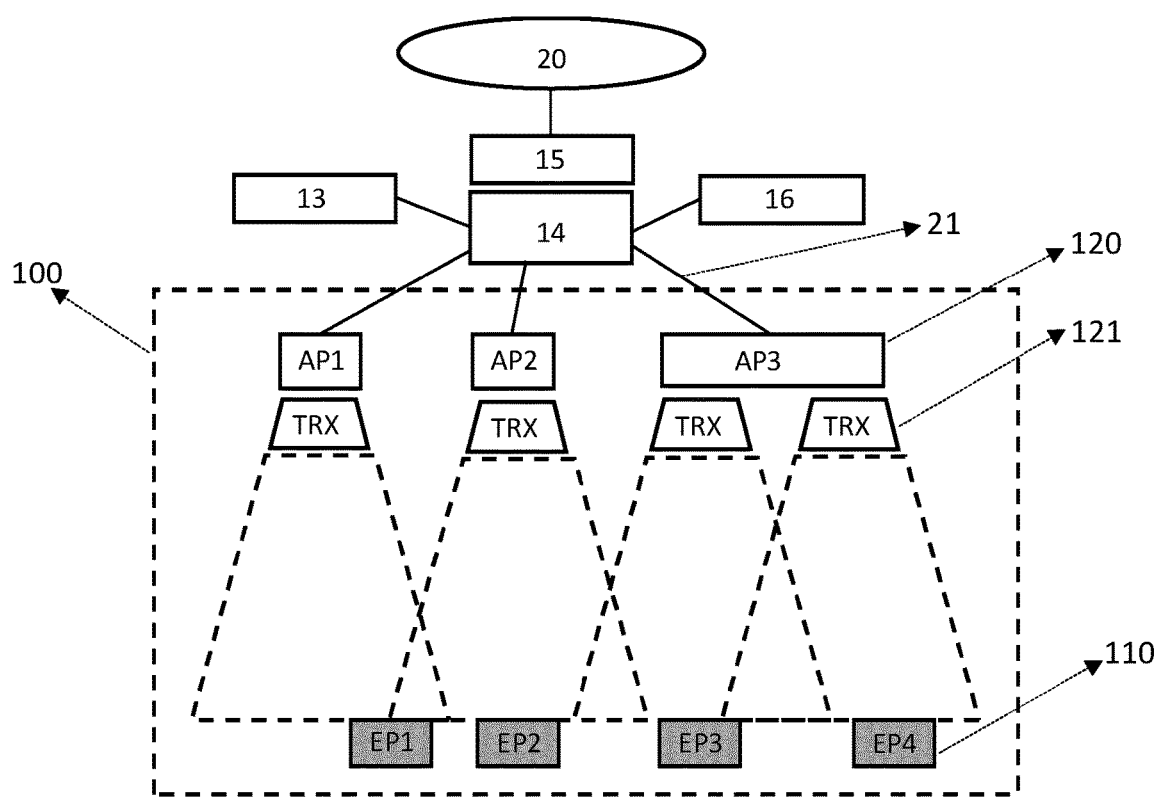
FIG. 1 demonstrates an overview of the OWC network, and the backbone network connected to it.

Various embodiments of the present invention will now be described based on an optical wireless communication (OWC) network system 100, or more specifically a Li-Fi network system, as shown in FIG. 1. For illustration purposes, the Li-Fi network 100 is connected to a backbone network 20 via an IP router 15 and an Ethernet switch 14, while in a practical system more routers and switches may be deployed to connect the backbone network to the Li-Fi network. In this example, the connection between the Li-Fi network and the backbone network is called a backbone connection 21. The backbone connection is a stable and high-speed link, which can be a wired connection, such as Ethernet, or a wireless connection based on radio frequency (RF) or millimeter-wave. The backbone connection can also be another kind of optical wireless link that is different from the one that an end point is performing in the optical multi-cell wireless network. One example of the other kind of optical wireless link can be free space point-to-point optical links.

Li-Fi System Overview and Network Architecture

As a wireless communication technology for local area networking, Li-Fi plays a similar role as Wi-Fi to provide the last tens of meters connectivity. A Li-Fi network 100 may comprise a plurality of optical access points (APs) 120 and network devices or end points (EPs) 110. Each end point 110 is selectively associated to and synchronized with a respective one of the access points 120. A Li-Fi AP 120 may be connected to one or multiple optical front ends or Li-Fi transceivers (TRX) 121, for providing access to Li-Fi devices or Li-Fi end points (EPs) 110. The trapezoids shown in dash lines illustrate field-of-views (FoVs) or coverage of individual Li-Fi transceivers 121. Only when an EP 110 is located in the coverage of a Li-Fi AP 120, will it be able to receive a downlink communication from that AP 120. By assuming symmetrical up and down links of the optical communication, a bidirectional optical link can be built up under the same condition. Because of the line-of-sight character of the optical communication link, adjacent access points 120 do not have a direct optical link amongst each other, whereas an end point 110 located in the overlapping area of the coverage of adjacent access points 120 is able to detect optical signals from both access points.

In one example, a Li-Fi AP 120 may also operate as a domain master with additional functionalities according to G. hn, ITU G.9960 and G.9961, to manage several Li-Fi EPs 110. In one implementation, handover happens when an EP roams from one domain to another. In another implementation, each Li-Fi AP 120 is operated as a domain master managing an individual domain hosting multiple Li-Fi EPs, which can be up to 255 Li-Fi EPs. Such Li-Fi APs 120 are typically located on the ceiling. They may, but not necessarily, be collocated with luminaires, especially when the communication is not based on visible light. The main functions of a Li-Fi AP 120 may include to advertise the presence of an AP 120 to Li-Fi EPs 110 in the surroundings, to register and deregister Li-Fi EPs 110, to provide medium access control (MAC) scheduling among associated Li-Fi EPs 110, to collect interference reports from EPs 110, to adjust local schedule in response to interference reports, and/or to report neighboring relations to the Li-Fi controller 13. Some of the functions of the Li-Fi AP 120, such as MAC scheduling for interference avoidance, may be implemented by the Li-Fi controller 13 in a centralized manner.

Li-Fi EPs or Li-Fi devices 110 are end user modems that facilitate end devices to connect to the Li-Fi network 100. Nowadays, a Li-Fi EP 110 is typically a dedicated entity connected to a laptop or other end devices. In the future, a Li-Fi EP 110 may be partially or fully integrated to a smart phone, a tablet, a computer, a remote controller, a smart TV, a display device, a storage device, a home appliance, or another smart electronic device.

There may be a Li-Fi controller or central controller 13 connected to the plurality of access points 120 in the Li-Fi network 100. The Li-Fi controller or central controller 13 is in charge of controlling the Li-Fi system in a centralized manner when necessary, such as deriving information about the topology and neighboring relationship, deciding scheduling among different Li-Fi access points (APs) for interference suppression. Furthermore, Li-Fi controller 13 may also be employed to provide a user interface that allows a user or admin, such as an IT manager, to configure schedules among multiple Li-Fi APs, monitor reports from these Li-Fi APs, and/or to derive further statistic information about the system performance. It is typically ensured that there is only one Li-Fi controller 13 is visible to an individual AP, which is achieved by means of network configuration so that traffic to and from a Li-Fi controller 13 is isolated inside its own network segment, via virtual LANs (VLANs) or similar. Furthermore, a protocol, such as a Control and Provisioning of Wireless Access Points (CAPWAP) protocol, can be used to discover multiple controllers and to select one controller that has free resources to host/manage an access point joining an infrastructure.

In one exemplary implementation of the Li-Fi system, a Li-Fi synchronization server 16 is connected to the system, which is in charge of synchronizing (or aligning) the G.vlc medium access control (MAC) cycles of the different G.vlc domains. This is needed to align some common time slots for detecting neighboring APs 120 and avoiding interference to an EP 110 located in the overlapping area of neighboring APs 120. Because of the line-of-sight characteristic of an optical link, neighboring APs 120 typically cannot detect the signals from one another directly. However, an EP 110 located in the overlapping area of two neighboring APs 120 may experience interference if the neighboring APs 120 are transmitting simultaneously. To avoid such situation, it may be necessary to keep adjacent APs 120 synchronized to a common time base, and to prevent them to transmit at the same moment. One preferred option for network synchronization is to employ the Precision Time Protocol (PTP), IEEE 1588v2. The PTP provides a sub-microsecond accuracy, which is fair enough for inter G.vlc domain MAC alignment. To keep the PTP accuracy, support from Ethernet switch is necessary, which should also be PTP capable. To keep the PTP accuracy, any element in the Ethernet network must handle PTP so the switch selected for any deployment must support and be configured to operate in the PTP mode accordingly.

It may also happen that a Li-Fi system is to be deployed in a legacy system where PTP is not supported by the existing infrastructure. And hence, additional measures should be taken to synchronize neighboring APs 120 in a different and maybe sub-optimal manner, and accordingly a solution should be found for an EP 110 to deal with the non-ideal synchronization among neighboring APs 120.

Detailed System Description

Li-Fi AP

Figure 2:
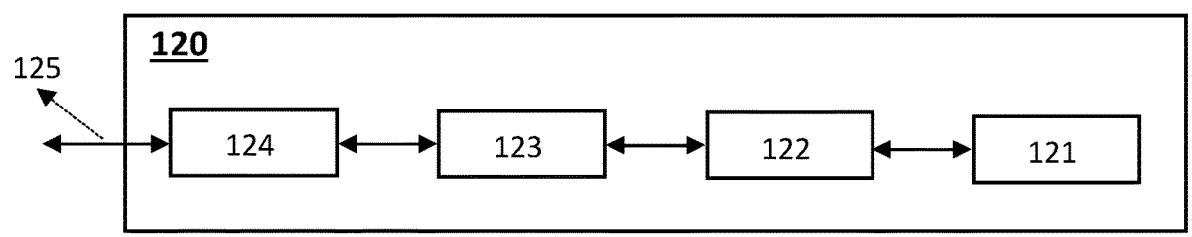
FIG. 2 schematically depicts basic components of a Li-Fi access point.

A Li-Fi AP 120 is a key unit to establish a Li-Fi network 100. In some scenarios, a Li-Fi AP 120 also forms the interface between an existing IT infrastructure and a Li-Fi network 100. A high-level block diagram of a Li-Fi AP 120 is shown in FIG. 2.

On one side, the Li-Fi AP 120 has an interface 124 to a backbone network, which can be a wired connection (Ethernet), or a wireless connection (RF, millimeter-wave, or another kind of optical wireless that is different from the one a Li-Fi EP is performing). And on the other side, the Li-Fi AP 120 has an optical front end 121 to enable the optical link with one or more Li-Fi EPs 110. Furthermore, the Li-Fi AP 120 also carries out the function to implement bi-directional translation or conversion between the data on the backbone network 20 and data on an optical link, in terms of conversion between different modulation schemes and conditioning of the analog signals. Therefore, a Li-Fi AP 120 comprises at least also a digital modulator and demodulator component 123 and an analog front end 122. In the transmission path, the analog front end (AFE) 122 may comprise a programmable amplifier, a filter, and a driver to condition and amplify the baseband signal to drive the optical front end. For the receiving path, the AFE 122 may comprise an attenuator, a low noise amplifier, a filter and a programmable gain amplifier to accommodate the received signals for the further digital processing.

The optical front end 121 comprising at least a light source and a light sensor implements the conversion between electrical signals and optical signals. In the transmitter chain, the optical front end 121 is used to convert the electrical transmitting signals to output optical signals via the light source. In the receiver chain, the optical front end 121 is used to convert the received optical signals to output electrical signals via the light sensor for further signal processing. The optical front end 121 is also called Li-Fi transceiver (TRX), such that:

- Li-Fi transmitter (Tx): transforms an electrical signal obtained from the AFE to an optical signal (e.g. to be emitted by an LED), and
- Li-Fi receiver (Rx): transforms a received optical signal (e.g. from a photodiode) to an electrical signal for the AFE.

Figure 3:
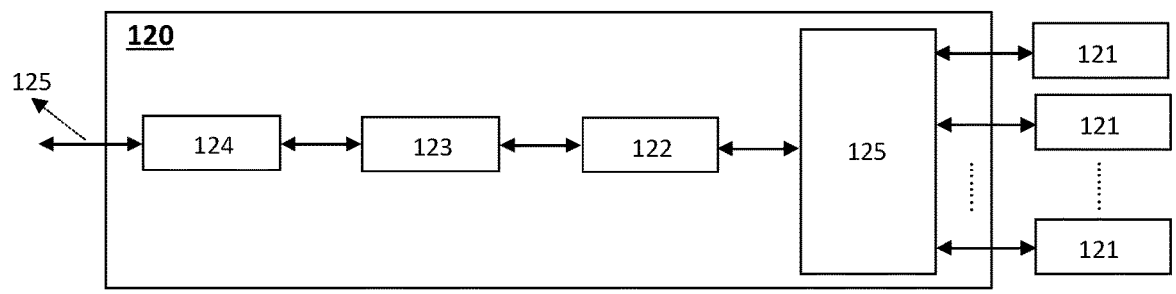
FIG. 3 schematically depicts basic components of a Li-Fi access point with multiple optical front ends.

A Li-Fi AP 120 may be connected to a single Li-Fi TRX 121, or multiple Li-Fi TRXs 121, which allows to transmit the optical signals over different optical paths. In case a Li-Fi AP 120 is connected to multiple Li-Fi TRXs 121, the Li-Fi AP may handle them as one coherent signal, or as (partially) separate incoherent signals for establishing a communication link. FIG. 3 shows an example of a Li-Fi AP 120 with multiple Li-Fi TRXs 121. A Li-Fi interface component 125 is adopted to split or combine the data sent to or received from the multiple Li-Fi TRXs 121.

Li-Fi EP

Figure 4:
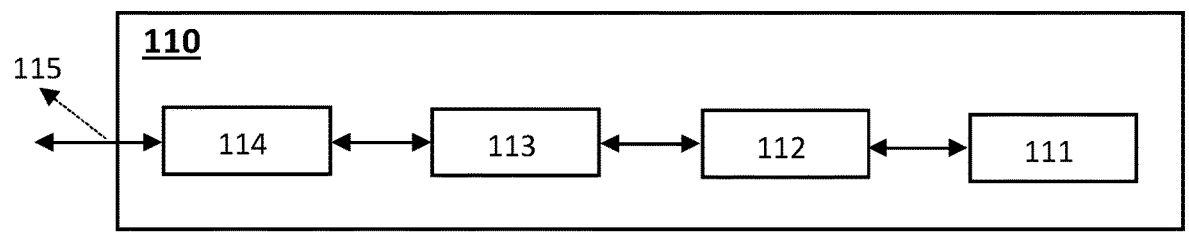
FIG. 4 schematically depicts basic components of a Li-Fi end point.

A high-level overview of a Li-Fi EP or a Li-Fi device 110 is shown in FIG. 4. Similar to a Li-Fi AP 120, a Li-Fi EP 110 comprises at least an optical front end 111, an analog front end 112, a digital modulator/demodulator 113, and an interface 114 to the end device or a processor.

A Li-Fi EP 110 may be connected to an end device as a separate entity via a cable or be partially or entirely integrated in the end device. For many end devices, such as laptop, smart phone, remote controller, Ethernet is a well-established interface in the operating system of the end devices. Li-Fi may also be used to provide communication interface to the end device in addition or instead. To simplify the system integration of a Li-Fi EP or Li-Fi device to the operating system of an end device, it is advantageous to employ Ethernet over USB. Therefore, in one option, the Li-Fi EP or Li-Fi device 110 can be connected to the end device via a standard USB cable or plug. With the example of using Ethernet over USB, a Li-Fi EP 110 may comprise the Ethernet over USB interface 114 and connect to the end device via a USB cable 115. A Li-Fi EP 110 may also be connected to one or more client optical TRXs 111, same as in a Li-Fi AP 120. Alternatively, a single optical frontend that has segmented transmitters/receivers where each transceiver/receiver is directed in a different respective direction is also envisaged.

In another example, a different interface 114 may be used to connect the Li-Fi EP to the operation system of the end device, and the corresponding interface 114 (Ethernet over USB) and/or the cable 115 should be replaced accordingly.

Figure 5:
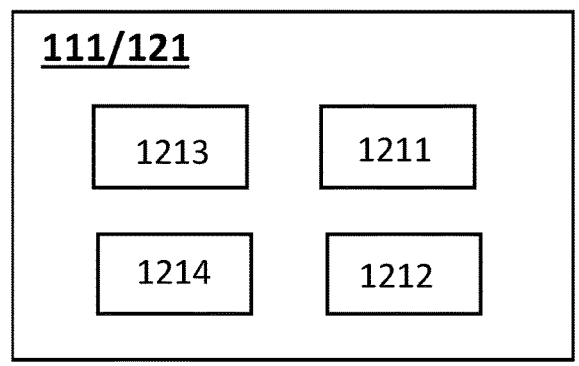
FIG. 5 schematically depicts basic components of an optical front end comprised in a Li-Fi access point or a Li-Fi end point.

FIG. 5 provides exemplary components of an optical front end or optical TRX 111,121 comprised in or connected to a Li-Fi AP 120 and a Li-Fi EP 110. An optical TRX 111, 121 comprises at least a light source 1211, a light sensor 1212, a driver 1213, and an amplifier 1214. The light source 1211 is used to convert the electrical transmitting signals to output optical signals, which can be a Light-emitting diode (LED), a Laser diodes (LD), or Vertical Cavity Surface Emitting Laser (VCSEL). The light sensor 1212 is used to convert the received optical signals to output electrical signals, which can be a pin-photodiode, an avalanche photodiode, or another type of light sensor. The driver 1213 is mainly used for regulating the power required for the light source 1211. The amplifier 1214 is mainly used to condition the received signals by the light sensor 1212 to make the signals suitable for further processing in the electrical circuits. In one example, the amplifier 1214 can be a transimpedance amplifier (TIA), which is a current to voltage converter implemented with one or more operational amplifiers. TIA may be located close to the receiving light sensor or photodiode 1212 to amplify the signal with the least amount of noise.

Inter-Connection in a Li-Fi System

Typically, Li-Fi APs 120 are deployed on the ceiling. And such APs 120 need to be powered first in order to carry out communication activities. Therefore, the connections to the APs 120 are meant for both power and data. An AP 120 sets up bidirectional link with the cloud, or the backbone network 20 at one side via the backbone connection 21, and at the other side the AP 120 communicates with one or more associated EPs 110 via optical links. An EP 110 typically obtain power from the end device that the EP is coupled to or integrated in and communicates with an associated AP 120 via an optical link.

Connecting a Li-Fi AP to the Backbone Network

Different options can be taken for a Li-Fi AP 120 to get connected to the backbone network 20.

In one aspect, data and power may be jointly delivered to a Li-Fi AP, which can be implemented via a single power cable with power line communication (PLC) or a single Ethernet cable with power over Ethernet (PoE).

PLC makes use of the existing power line cables, i.e. for providing a device with mains power, also for data communication. Popular PLC communication standards, such as HomePlug® or G.hn, utilize Orthogonal Frequency Division Multiplexing (OFDM) technology, which is also widely adopted in a Li-Fi system. Hence, the physical layers (PHY) of a PLC system and a Li-Fi system may be quite similar, such as the modulation methods and the synchronization methods used in both systems. However, transmission in the optical domain are unipolar whereas in general OFDM uses bipolar signals. As a result, some adaptation may be required for transmission in the optical network. A simple solution is the use of a DC-offset which does not require demodulation and subsequent remodulation of an OFDM based PLC signal prior to optical transmission, or alternatively demodulation and subsequent remodulation using unipolar OFDM modulation techniques such as ACO-OFDM, DCO-OFDM, ADO-OFDM and/or Flip OFDM. Therefore, it may be quite convenient for a Li-Fi AP 120, which is typically collocated with the luminaire on the ceiling, to make use of the existing power cable to obtain also the data connection to the backbone network 20.

However, it is also recognized that the channel of a PLC system is quite noisy, given that the mains power line may act as an antenna to pick up all kinds of undesired signals that may interfere with communication signals that are also present on the mains power line. It is thus important for the Li-Fi over PLC enabled devices to cope with such external interference. Furthermore, a communication signal over a mains power line experiences an amount of attenuation that cannot be predicted during manufacturing and may vary over the day. The impact factors include the length of the cable that varies from building to building, that power loads that form more or less a short circuit for high frequencies and be switched on or off, etc.

A known solution to address the problems introduced by a PLC system on signal integrity is to equip an Li-Fi over PLC enabled device with a PLC decoder for decoding a PLC communication signal received over the mains power line. Impairments on communication signals are handled digitally. For instance, a narrowband interferer causes error on just single subcarrier of an OFDM modulated signal. The reconstructed data may be corrected using error correction algorithms. Subsequently, the reconstructed data is then transformed back to the analog domain for modulating the LED current flowing to the at least one LED. In such a way, a more robust operating device can be provided wherein the loss of data is reduced, although one of the drawbacks of this solution is that the device gets large in size, complex, costly.

On the other hand, if power can be delivered via an Ethernet cable, it may also be convenient for a Li-Fi AP to make use of existing IT infrastructure to obtain both power and connection to the backbone network 20. Power over Ethernet (PoE) is described in the IEEE802.3af/at standard and is currently being extended towards 4-pair power in the IEEE Task Force P802.3bt. PoE is intended to supply power voltage levels of 40 V to 48 V from Power Sourcing Equipment (PSE) to Powered Devices (PDs), alongside data lines for control and communication purposes. A PSE device is also referred to as PoE switch. In PoE lighting systems PDs may be light sources, user interface devices and sensors. The PSE is typically powered from a mains power source, such as according to the IEC/TR 60083 standard. Traditional PoE systems will transport data and power over a network and its end points, hence among PSEs and PDs.

Data can therefore be received by the control device, e.g., via Ethernet connection using the Ethernet Protocol. Data is communicated via the Ethernet Protocol between devices in power over Ethernet systems. Therefore, a microchip in form of an Ethernet controller can be used to establish a communication link between the devices, which supports Media Access Control (MAC) and physical layer (PHY) of the Open Systems Interconnection model (OSI model).

An Ethernet connection can for example be an optical fiber, an electric wire or a twisted pair cable, such as a Cat 3 cable, Cat 4 cable, Cat 5 cable, Cat 5e cable, Cat 6 cable, Cat 6A cable, Cat 7 cable, Cat 7A cable, Cat 8 cable, Cat 8.1 cable, or Cat 8.2 cable. The Ethernet connection can have several pairs of cables, e.g., 2, 3, 4, or more pairs of cables. The cables can be unshielded or shielded, in particular individually or overall shielded. The power and data may be transmitted via the same fiber, wire, or cable of the Ethernet connection or via different fibers, wires, or cables of the Ethernet connection. In case of transmission of power via an optical fiber the power can be transmitted in the form of photons that can be received by a solar cell unit of the data receiving device.

The data receiving device in a PoE system can comprise one or more ports. Each of the ports can comprise one or more pins. A pin can be configured for receiving power, data or power and data. Additionally, or alternatively, the port can also comprise one or more solar cell units for receiving power in the form of photons. As the ports can receive power and data via the Ethernet connection some of the pins can be supplied with power, while other pins are supplied with data via the Ethernet connection. Alternatively, or additionally, a pin can also be supplied with power and data via the Ethernet connection.

In another aspect, data and power may be separately delivered to a Li-Fi AP, and the options can be either via both a power cable and an Ethernet cable (wired connection to a backbone network), or a combination of a power cable and a wireless link to the backbone 20 (optical wireless links or free space optical link).

Preferably, a Li-Fi system may be integrated to an existing wireless communication system, such as a Wi-Fi system or a cellular system. And hence, a Li-Fi AP 120 may be integrated to or directly-connected a Wi-Fi access point or a cellular base station. By having a conversion or translation of signals between the Li-Fi AP 120 and the Wi-Fi access point or the cellular base station, the existing infrastructure of a Wi-Fi system or cellular system can be employed to provide the connection to the backbone network 20 for the Li-Fi AP 120.

Connecting a Li-Fi EP to a Li-Fi AP

A Li-Fi EP 110 gets access to a Li-Fi system via a Li-Fi AP 120, and the associated Li-Fi AP 120 is often called a local AP. There are several aspects to be considered for the connection between a Li-Fi EP 120 and a Li-Fi AP 110:

Coverage: a Li-Fi EP may not always be able to see a Li-Fi AP depending on its location, its orientation, the positioning of the Li-Fi APs, and the size of the Li-Fi EP's transducer/sensor coverage area.

Downlink interference: a Li-Fi EP that is in the overlapping coverage area of multiple optical downlinks experiences interference if these Li-Fi APs transmit at the same time.

Uplink interference: A Li-Fi EP that transmits a signal to an associated Li-Fi AP while another Li-Fi EP is transmitting to this same Li-Fi AP results in uplink interference at the Li-Fi AP.

Handover: Because of the mobility of a Li-Fi EP, a handover is needed when a Li-Fi EP moves from the coverage area of one Li-Fi AP to a neighboring Li-Fi AP. That is to say, when a Li-Fi EP (such as connected to or comprised in a user device, a client device, a mobile phone, etc.), moves from the current cell to the neighboring cell, then any active communication must be handed over to the node or access point of that neighboring cell. Handovers are intended to be made as quickly as possible in order to reduce disruption to any ongoing communication or data transfers and may include a preparation period in order to facilitate this. When insufficient time is available to prepare and establish a link to the new Li-Fi AP before the link with the existing Li-Fi AP is broken, the Li-Fi EP may experience a period in which it has no connection. Considering the relatively small size of a Li-Fi cell due to the line-of-sight character of the optical link, seamless handover is important to guarantee the link quality and the user experience.

Basically, a Li-Fi EP 110 can be connected to a Li-Fi AP 120 via bidirectional optical link, or a hybrid downlink and uplink. Note that here the downlink stands for the communication link from the Li-Fi AP 120 to the Li-Fi EP 110, and the uplink stands for the communication link from the Li-Fi EP 110 to the Li-Fi AP 120. A bidirectional optical link enables a relatively symmetrical connection between the Li-Fi EP 110 and the Li-Fi AP 120. Hence, both downlink and uplink enjoy the same advantages of Li-Fi communication as addressed above. However, in some application scenarios, such as for web-surfing or video streaming, the link between a Li-Fi AP and a Li-Fi EP can also be a hybrid link, which is a combination of an optical downlink from the Li-Fi AP 120 to the Li-Fi EP 110 and a radio frequency (RF) uplink from the Li-Fi EP 120 to the Li-Fi AP 110. The RF link may be in accordance with a popular short-range wireless communication protocol, such as Wi-Fi, BLE, or Zigbee, or be in accordance with a cellular communication protocol, such as 4G or 5G cellular.

Referring back to the options that the Li-Fi AP 120 may be built via a combo device supporting both Li-Fi AP function and Wi-Fi access point or cellular base station function, such hybrid link can be handled seamlessly by a controller at the Li-Fi AP side. Since a Li-Fi EP 110 is typically connected or integrated to an end device, which can be a smart phone, a tablet, a computer, or another smart device, the end device may already have the hardware support for the short range wireless communication protocol or cellular protocol used in the hybrid link. Therefore, such hybrid link may also leverage the existing resource of the end device and provide a simplified solution for the Li-Fi EP, which only requires a receiving path, but not a transmitting path. The cost, power consumption, and form factor of the EP 110 may be further reduced in such a manner. Correspondingly, the Li-Fi AP 120 is also simplified by comprising mainly an optical transmitter to send data to the Li-Fi EP 110 via an optical downlink, whereas the RF-based uplink from the Li-Fi EP 110 to the AP 120 may be received by leveraging the RF receiver in the combo device or co-located Wi-Fi access point/cellular base station, or via a dedicated RF receiver comprised in the Li-Fi AP 120 itself.

Scheduling and Interference Suppression within an Optical Multi-Cell Wireless Network When there are multiple Li-Fi APs 120 deployed next to each other or when there are multiple EPs 110 associated to the same local AP 120 or to adjacent APs 120, medium access control (MAC) become necessary for an interference free optical communication. Different MAC mechanisms are possible to be employed in the optical multi-cell wireless network, such as time-division multiple access (TDMA), frequency-division multiple access (FDMA), carrier-sense multiple access (CSMA), code division multiple access (CDMA), space-division multiple access, or a combination of one or more aforementioned mechanisms. TDMA is based on time-division multiplexing scheme, where radio resource is scheduled in time domain and different time slots are assigned to different transmitters in a typically cyclically repetitive frame structure or MAC cycles. FDMA is based on frequency-division multiplexing, where different frequency bands are allocated to different devices for simultaneous transmission. And in optical communication, FDMA can also be evolved into wavelength division multiple access (WDMA), which is based on wavelength-division multiplexing. Another advanced version of FDMA is orthogonal frequency-division multiple access (OFDMA), where each device may use one or more subcarriers out of the entire band. OFDMA has more flexibility in providing different data rates or quality of service to different users, and in the meanwhile a high resource efficiency can be maintained despite of such diversity. CSMA typically employs "listen-before-talk" approach, where a device verifies the absence of any other traffic before transmitting on a shared medium. CSMA is widely used in a sparse network, and when the density of nodes scales, further collision-avoidance techniques come into place. CDMA is typically built on top of spread spectrum, and a common form is direct-sequence CDMA that is based on direct-sequence spread spectrum, where different devices send messages simultaneously with different spreading codes that are orthogonal to each other. Given the typically smaller FoV of an optical link as compared to a radio link, space-division multiple access may also be a very attractive solution here.

In a TDMA-based multi-cell network with multiple APs 120, due to the lack of direct communication, adjacent APs 120 sometimes may not have synchronous MAC cycles. Although the durations of one MAC cycle or super frame is typically the same for all the APs 120 in the network, the start times of MAC cycles can be different for individual APs 120. Note that the start time of a MAC cycle is used by an AP as a local time reference to divide the wireless medium into consecutive time slots. Such an offset of MAC cycles among two adjacent APs 120 may cause interference to an EP 110 located in the overlapping coverage areas of these two adjacent APs 120, even when a time slot is allocated exclusively to one AP 120 for communication with the EP 110 in the overlapping area. Therefore, it may be necessary for the APs 120 to synchronize to a common time base. The common time base may be obtained via synchronization handshake, via a reference clock distributed over the network (such as synchronous Ethernet clocks), or via a dedicated synchronization server in the network, or derived from a common signal, such as the zero crossing of the mains power. However, due to an uncertain delay in the network or an interference, there may still be timing synchronization uncertainty of the APs against the timing reference. It may still be necessary for an EP 110 located in the overlapping area of at least two adjacent APs 120 to derive timing information related to MAC cycles of the at least two APs 120 based on downlink communication from these APs, which can be either a normal data communication link or an out-of-band signaling message. Then, based on the derived timing information related to MAC cycles of the at least two APs 120, the EP 110 may further assist at least one out of the two adjacent APs 120 to adjust its MAC cycles to get aligned with the other.

Trigger Based Optical Wireless Communication System

To deploy a Li-Fi network, depending on a Li-Fi AP is integrated to a luminaire or not, a Li-Fi system may be classified as a non-standalone mode or standalone mode.

With the first option, Li-Fi APs are integrated into luminaires in a non-standalone mode via the usage of sensor slots of the luminaires. APs may be directly powered from mains or PoE, or preferably APs are directly powered from the luminaires. Connections between AP may be realized with a pair or two wires (e.g. IEEE 100BASE-T1 or 1000BASE-T1) of distance limited to 15 m with unshielded twisted pair (UTP) or 40 m with shielded twisted pair (STP). An AP may have connection to the backbone network, or Internet (WAN) via an Ethernet-Switch. Preferably, a master-slave architecture may be used to organize more than one Li-Fi APs. Only the master AP comprises an Ethernet switch, while a slave AP is connected via 2 wires with ports of the Ethernet-Switch inside the Master AP. Ports of the Ethernet-Switch can be switch ON/OFF. Different Power classes may be implemented for different ports. A slave AP may mainly operate with low power detection circuit for detecting a valid trigger signal, may switch to a normal operation mode only if a Li-Fi end device (such as a user equipment with Li-Fi capability: dongle, laptop, smartphone, etc.) is detected in the coverage area. The Li-Fi end device may send an optical signal through a low power optical link such as according to an IR remote RC5 protocol to trigger the AP to switch from a low power mode to normal operation mode. Hence, the AP can save power when no highspeed link is required.

With the second option, a Li-Fi AP is placed separately from the luminaire in a standalone mode. Connections between APs may be realized also with two wires (e.g. IEEE PoDL—Ethernet technology with remote power feeding) of a distance limited to 15 m for UTP or 40 m for STP. Similar to the first option, a master-slave architecture may be used to organize more than one Li-Fi APs, and a slave AP may mainly operate with low power detection circuit for detecting a valid trigger signal.

Figure 6:
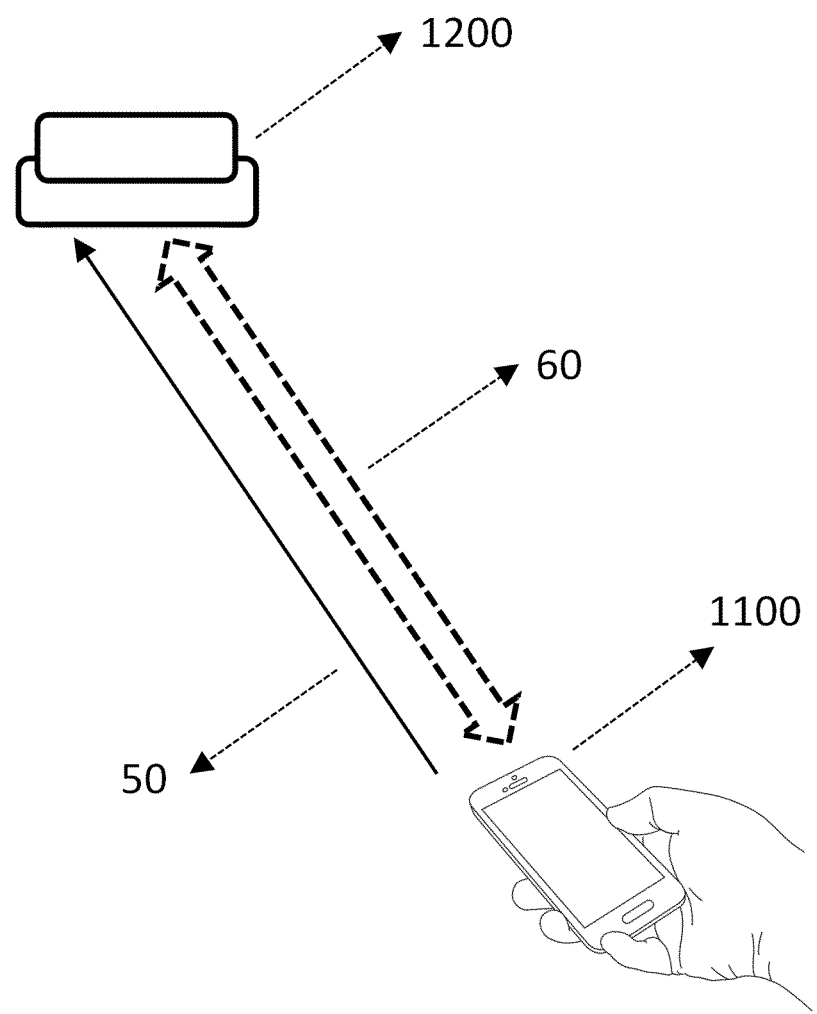
FIG. 6 illustration of a trigger-based Li-Fi system.

A trigger-based Li-Fi system is demonstrated in FIG. 6. The access point 1200 can operate in at least two different operation states, a low power state and a normal operation state. By default, the access point 1200 operates in a low power state for detecting a first optical signal 50 from an end point device 1100 on a first optical channel. Only when a valid trigger signal is identified after detecting the first optical signal 50, the access point 1200 switches from the low power state to a normal operation state for establishing a high-speed optical data link 60 with the end point device 1100. When there is no active high-speed optical data link 60 with any end point device 1100 for a predefined period of time, the access point 1200 switches back to the low power state. Since the access point dissipates less power in the low power state, with the trigger-based operation, the energy waste due to idle operation, such as waiting for an active link, is reduced accordingly.

The high-speed optical data link 60 is established on an optical data channel different from the first optical channel. The optical data channel is of large bandwidth to support high data rate communication, which may be deployed in visible light, Ultraviolet (UV), or Infrared (IR) spectra. The first optical channel is of narrow bandwidth to support low data rate low power optical communication, which may be located in the same or different frequency band as compared to the optical data channel. Preferably, the first optical channel is a low power narrow band IR channel.

The end point device 1100 also has at least two different operation states. To initiate a data link, the end point device 1100 first operates in a low power state for sending the first optical signal 50 on the first optical channel, and then switch to a normal operation state for establishing a high-speed optical data link 60 with an access point 1200. When there is no immediate need for the high-speed optical link 60, the end point device 1100 switches from the normal operation state to either the low power state or a sleep state. The decision on whether switching back to the low power state or the sleep state may be made according to an application profile, a user preference, or the battery status of the end point device. For example, if there is a relatively large interval expected till establishing a next high-speed data link, the end point may opt to switch to the sleep state, or even a power-off state.

Preferably, signaling exchange may be implemented on the first optical channel between the access point and the end point device in the low power state before switching to a normal operation mode. For example, the access point and the end point device may negotiate on a setting for the high-speed optical data link, and a valid trigger signal is only identified after a setting for the high-speed optical data link is agreed between the access point and the end point device. The setting may be related to a data rate, a bandwidth, a data channel index, a modulation or coding scheme to be used for the high-speed optical data link. The setting may also be related to a time schedule, such that the access point and the end point device agree upon a delay before establishing the high-speed optical data link. Thus, the access point may not switch to the normal operation mode immediately, but according to the time schedule. Thus, the chance that the access point and/or the end point device switch to the normal operation mode wrongly will be further reduced.

Figure 7:
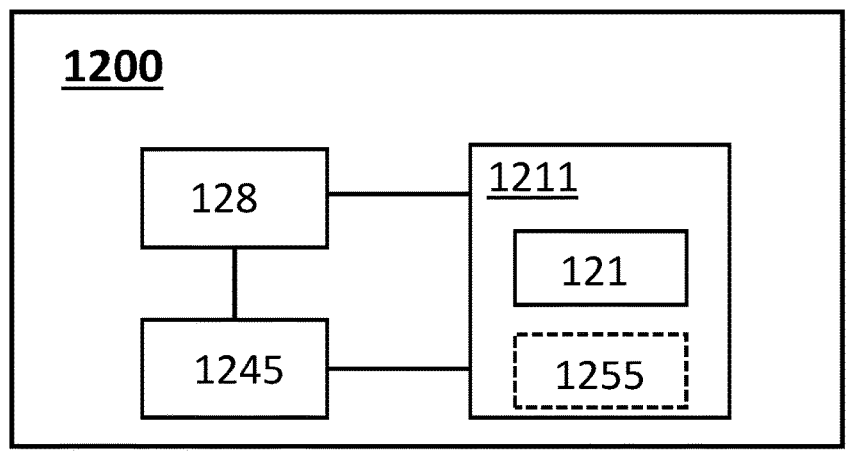
FIG. 7 schematically depicts basic component of an access point in an optical wireless communication network.

FIG. 7 schematically depicts basic components of the access point. The access point comprises an optical transceiver 1211 comprising one or more optical front ends 121,1255, a power management unit 1245 and a controller 128. The power management unit 1245 is configured to set the Li-Fi function blocks to either active mode or sleep mode according to a current operation state of the device. The controller 128 is configured to control the power management unit according to a trigger event. Optionally, the optical transceiver 1211 further comprises another dedicated optical receiver 1255, which is used for the reception of the first optical signal from the end point device. According to one embodiment, a bi-direction link is to be established on the first optical channel for the negotiation of a setting on the high-speed data link, the module 1255 may be a dedicated low power transceiver, such as a narrow band IR transceiver. If the first optical channel is located in the same frequency band as the optical data channel, the low power state may be achieved by using the same hardware component, such as the same optical front end 121, with a different configuration.

As one example, 1255 is a lower power IR receiver that makes use of existing IR remote control protocols e.g. RC5 or RC6 or even a simpler version since it only needs to detect presence of an end point device, such as a dongle. In another example, the RC5 or RC6 may be implemented with the Li-Fi IR front end 111 for data communication, such that the Li-Fi IR LEDs 111 may be operated in lower power mode with reduced features just for an RC code.

Figure 8:
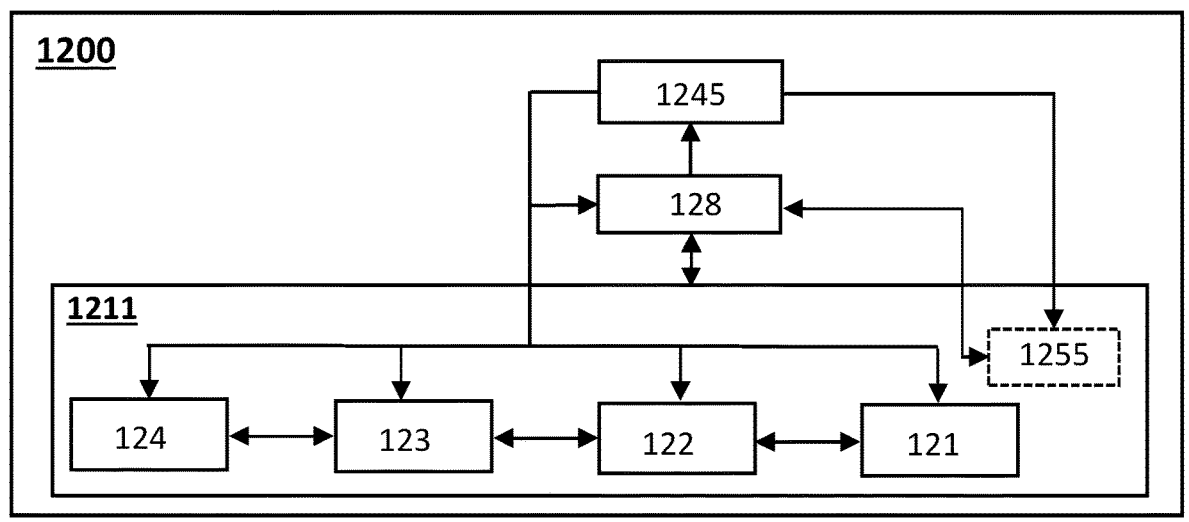
FIG. 8 schematically depicts one implementation of an access point in an optical wireless communication network.

FIG. 8 provides a detailed implementation of the access point. The optical transceiver 1211 is realized as a complete Li-Fi transceiver that comprises at least an optical front end 121, an analog front end 122, a digital modulator/demodulator/modem 123, and an interface 124 to a backbone network. The first optical signal may be received via the same optical front end 121 with a different configuration as compared to the normal operation mode. The power management unit 1245 may be configured to turn off all or some of the other modules in the optical transceiver 1211, such as the analog front end 122, the modem 123, and the interface 124 in the low power state. Optionally, the optical transceiver 1211 may comprise a further dedicated low power optical receiver or transceiver 1255 according to the aforementioned embodiments of the access point.

Figure 9:
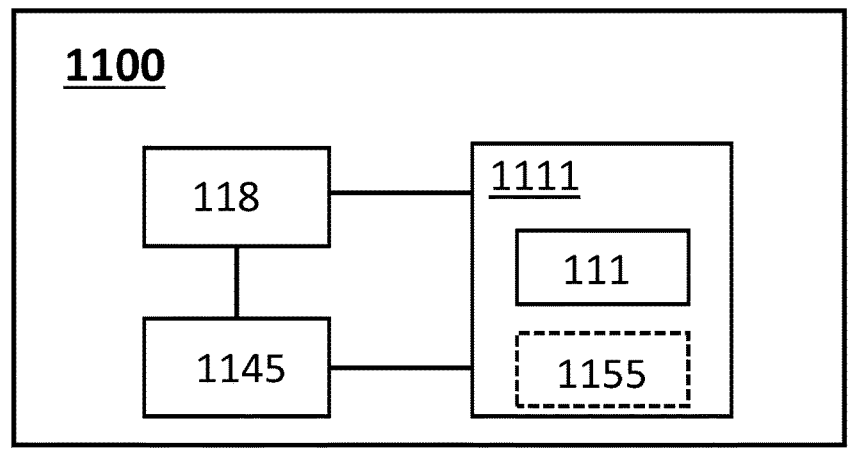
FIG. 9 schematically depicts basic component of an end point device in an optical wireless communication network.

FIG. 9 schematically depicts basic components of an end point device in an optical wireless communication network. The end point device comprises an optical transceiver 1111 comprising one or more optical front ends 111,1155, a power management unit 1145 and a controller 118. The power management unit 1145 is configured to set the Li-Fi function blocks to either active mode or sleep mode according to a current operation state of the end point device. The controller 118 is configured to control the power management unit 1145. Optionally, the optical transceiver 1111 further comprises another dedicated optical transmitter 1155, which is used for the transmission of the first optical signal. According to one embodiment, a bi-direction link is to be established on the first optical channel for the negotiation of a setting on the high-speed data link, the module 1155 may be a dedicated low power transceiver, such as a narrow band IR transceiver. If the first optical channel is located in the same frequency band as the optical data channel, the low power state may be achieved by using the same hardware component, such as the same optical front end 111, with a different configuration.

Figure 10:
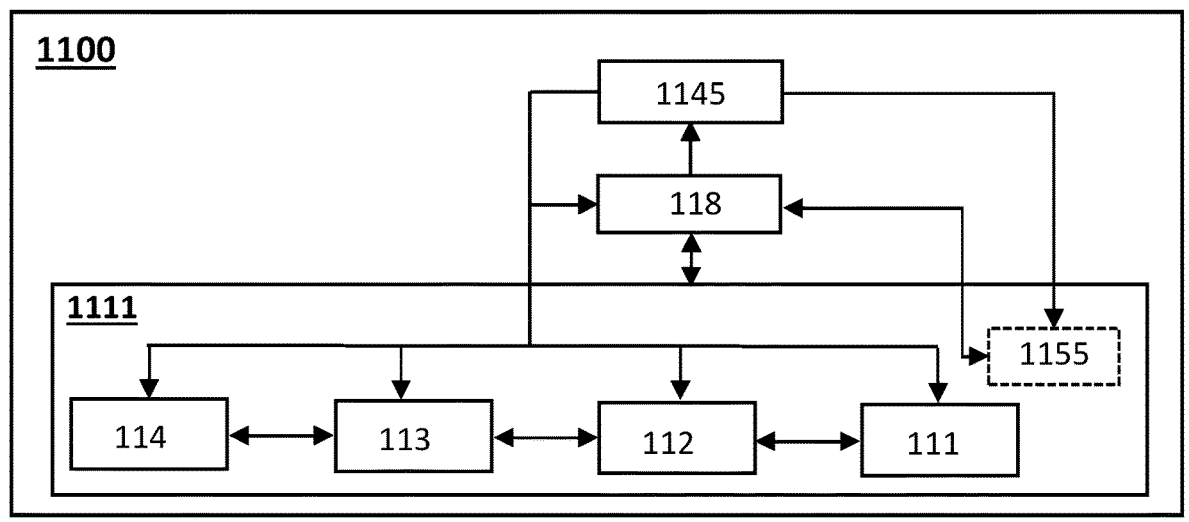
FIG. 10 schematically depicts one implementation of an end point device in an optical wireless communication network.

FIG. 10 schematically depicts one implementation of the end point device. The optical transceiver 1111 is implemented as a complete Li-Fi transceiver that comprises at least an optical front end 111, an analog front end 112, a digital modulator/demodulator/modem 113, and an interface 114 to an end device that the Li-Fi transceiver is connected to or comprised in. The first optical signal may be sent via the same optical front end 111 with a different configuration as compared to the normal operation mode. The power management unit 1145 may be configured to turn off all or some of the other modules in the optical transceiver 1111, such as the analog front end 112, the modem 113, and the interface 114 in the low power state. Optionally, the optical transceiver 1111 may comprise a further dedicated low power optical transmitter or transceiver 1155 according to the aforementioned embodiments of the end point device.

With the option that the access point and/or the end point device comprise a dedicated low power optical receiver (access point) or transmitter (end point device) or transceiver (access point, end point device), the following power states may be defined:

Normal operation state: all the components are active ("ON");

Low power state: low power optical receiver (access point) or low power optical transmitter (end point device) or low power optical transceiver (access point, end point device) are active ("ON"); optical transceiver for high-speed link (optical front end 111, 121, analog front end 112,122, modem 113, 123, end point Interface 114) are "OFF" or an unpowered state; Ethernet interface 124 of the access point is in sleep mode, and is capable to receive a periodic synchronization clock signal, such as according to Energy Efficient Ethernet (EEE) IEEE 802.3az standard;

Sleep state or power-off state: low power optical receiver (access point) or low power optical transmitter (end point device) or low power optical transceiver (access point, end point device) are "OFF"; optical transceiver for high-speed link (optical front end 111, 121, analog front end 112,122, modem 113, 123, end point Interface 114) are "OFF"; Ethernet interface 124 of the access point is in deep sleep mode, and is to be triggered by the second trigger signal from a master access point. Therefore, in the sleep state or power-off state, a slave access point can only be woken up by a master access point according to a schedule or a trigger event. For an end point device, it can only be woken up by a user command, a scheduled timer, or a request from an application.

Figure 11:
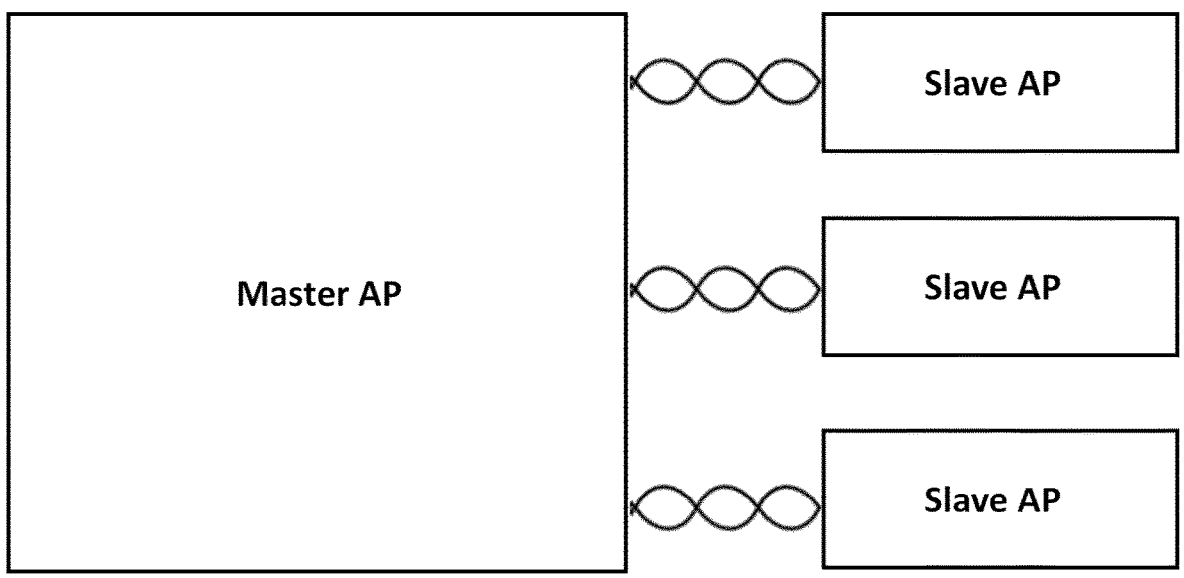
FIG. 11 illustration of a master-slave based Li-Fi system.

FIG. 11 provides an illustration of multiple APs arranged in a master-slave structure. As compared to a slave AP, a master AP may further comprise an Ethernet switch providing an access to a backbone network to one or more slave APs, and the access may be provided according to a Ethernet standard, such as via a 1000BASE-T1 interface. In addition to that, the master AP may also be configured to provide power to the one or more slave APs. With a PoE technology, the master AP may deliver power and data via the same cable to the slave APs. Advantageously, the PoDL (Power over Data Line) technology may be adopted for the powering between the master and slave AP since it only requires one twist pair for data and power.

In one example, the master AP operates by default in the normal operation state, while a slave AP by defaults operates in the low power state for detecting an end point device. The Slave AP is powered via one twisted pair and dissipates very low power (only the low power IR receiver is active). Upon detecting a valid trigger signal, the Ethernet interface 124 is activated to establish the Ethernet link, and the modem 123, analog front end 122, and optical front end 121 are activated to establish a high-speed data link with the end point device.

A further embodiment is to implement a protocol between the master AP and the slave AP for further power reduction. Beneficially, the master AP may turn on or off a slave AP via a second trigger signal according to a schedule or an event. For example, the master AP may first send a second trigger signal to a slave AP to instruct the slave AP to switch from the low power state to a sleep state or power-off state to further reduce power. In the sleep state, the access point is not able to detect the presence of an end device but relies on the other access point to provide another second trigger signal to wake up from the sleep state to the low power state. The second trigger signals are sent via a cable connecting the master AP and the slave AP.

In another example, both the master AP and slave APs may enter a low power state waiting for a trigger from an end point device. The master AP may determine its operation state by further considering the status of slave APs connected to it. For example, when there is at least one connected slave AP is in the normal operation mode, the Ethernet switch in the master AP will keep in the operation mode, while the rest part of the master AP may enter the low power state to be triggered by an end point device.

Figure 12:
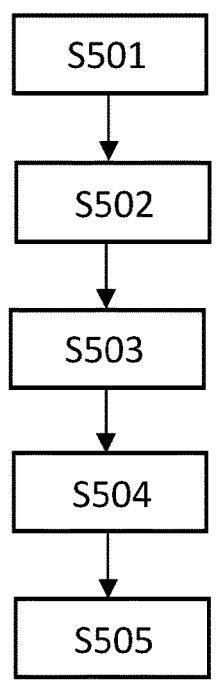
FIG. 12 shows a flow chart of a method for operating an access point in an optical wireless communication network.

FIG. 12 shows a flow diagram of a method 500 for operating an access point in an optical wireless communication network. The method 500 comprises the access point 1200 operating in step S501 in a low power state for detecting a first optical signal 50 from an end point device 1100 on a first optical channel; in step S502, the access point identifies a valid trigger signal after detecting the first optical signal 50. In step S503, the access point switches from the low power state to a normal operation state upon identification of the valid trigger signal. Then in step S504, the access point 1200 operates in the normal operation state for establishing a high-speed optical data link 60 with the end point device 1100. When there is no active high-speed optical data link 60 with any end point device 1100 for a predefined period of time, the access point switches back to the low power state from the normal operation state in step S505.

Figure 13:
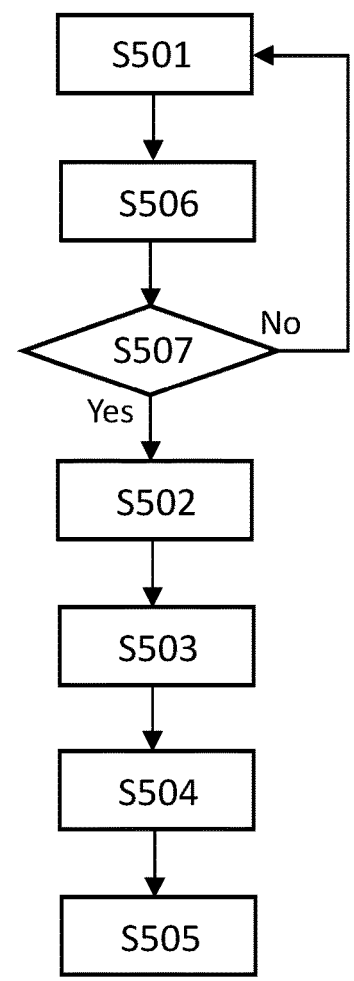
FIG. 13 shows a flow chart of another embodiment of the method for operating an access point in an optical wireless communication network.

FIG. 13 shows a flow diagram of another embodiment of the method 500. The step S502 of identifying the valid trigger signal further comprises step S506 of the access point 1200 negotiating on a setting for the high-speed optical data link 60 with the end point device 1100 on the first optical channel upon the detection of the first optical signal 50; after a setting for the high-speed optical data link 60 is agreed between the access point 1200 and the end point device 1100 in step S507, a valid trigger signal is then identified in step S502.

FIG. 14 shows a flow diagram of a method 600 for operating an end point device 1100 in an optical wireless communication network 100. The method 600 comprises the end point device 1100 operating in a low power state for sending a first optical signal 50 on a first optical channel in step S601. In step S602, the end point device switches from the low power state to a normal operation state after sending the first optical signal 50; and operates in the normal operation state for establishing a high-speed optical data link 60 with an access point 1200 in step S603. When there is no immediate need for the high-speed optical link 60, the end point device 1100 switches from the normal operation state to the low power state or a sleep state in step S604.

FIG. 15 shows a flow diagram of another embodiment of the method 600 for operating an end point device. After sending the first optical signal 50 and before switching to the normal operation state, the method 600 further comprises the end point device 1100 negotiating in step S605 on a setting for the high-speed optical data link 60 with the access point 1200 on the first optical channel; and in step S606 determining to switch to a normal operation state after a setting for the high-speed optical data link 60 is agreed between the access point 1200 and the end point device 1100.

The methods according to the invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer.

Methods, systems and computer-readable media (transitory and non-transitory) may also be provided to implement selected aspects of the above-described embodiments.

The term "controller" is used herein generally to describe various apparatus relating to, among other functions, the operation of one or more network devices or coordinators. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, compact disks, optical disks, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network.

The invention claimed is:

1. A method for operating an access point in an optical wireless communication network, the method comprising the access point:
    operating in a low power state for detecting a first optical signal from an end point device on a first optical channel;
    generating a trigger signal after detecting the first optical signal;
    switching from the low power state to a normal operation state based on the generated trigger signal;
    operating in the normal operation state for establishing a high-speed optical data link with the end point device;
    switching back to the low power state from the normal operation state when there is no active high-speed optical data link with any end point device for a predefined period of time; and
wherein the access point dissipates less power in the low power state than in the normal operation state,
wherein prior to generating the trigger signal, the method further comprises the access point:
    negotiating on a setting for the high-speed optical data link with the end point device on the first optical channel upon the detection of the first optical signal;
and wherein the step of generating the trigger signal follows after a setting for the high-speed optical data link is agreed between the access point and the end point device;
and wherein the high-speed optical data link is established on an optical data channel different from the first optical channel.

2. The method according to claim 1, wherein the low power state is achieved by disabling a hardware component or by disabling a hardware component and enabling a different hardware component in the access point.

3. The method according to claim 1, wherein the first optical signal is an infrared signal.

4. The method according to claim 1, the method further comprising the access point switching between the low power state and a sleep state upon reception of a second trigger signal from another access point; and wherein the access point dissipates less power in the sleep state than in the low power state.

5. The method according to claim 4, wherein the access point is a slave access point, and the other access point from which the second trigger signal is received is a master access point.

6. The method according to claim 5, wherein the slave access point is connected to a backbone network via the master access point.

7. The method according to claim 5, wherein the slave access point is powered from the master access point.

8. A non-transitory computing readable medium comprising instructions which, when the instructions are executed by an access point comprising a processor, cause the processor of the access point to perform the method of claim 1.

9. A method for operating an end point device in an optical wireless communication network, the method comprising the end point device:
    operating in a low power state for sending a first optical signal on a first optical channel;
    switching from the low power state to a normal operation state after sending the first optical signal;
    operating in the normal operation state for establishing a high-speed optical data link with an access point;
    switching from the normal operation state to the low power state when there is no immediate need for the high-speed optical link; and
wherein the end point device dissipates less power in the low power state than in the normal operation state;
wherein after sending the first optical signal and before switching to the normal operation state, the method further comprises the end point device:
    negotiating on a setting for the high-speed optical data link with the access point on the first optical channel;
    determining to switch to a normal operation state after a setting for the high-speed optical data link is agreed between the access point and the end point device;
and wherein the high-speed optical data link is established on an optical data channel different from the first optical channel.

10. The method according to claim 9, wherein when no setting for the high-speed optical data link could be agreed between the access point and the end point device, the method further comprises the end point device either:
    remaining in the low power state for sending a second optical signal on the first optical channel; or
    switching from the low power state to a sleep state.

11. An end point device in an optical wireless communication network, the end point device comprising:
    an optical transceiver comprising one or more optical front ends;
    a power management unit; and
    a controller; and
wherein the end point device is configured to perform the method of claim 9.

12. An access point in an optical wireless communication network, the access point comprising:
    an optical transceiver comprising one or more optical front ends;
    a power management unit; and
    a controller; and
wherein the access point is configured to:
    operate in a low power state for detecting a first optical signal from an end point device-on a first optical channel;
    generate a trigger signal after detecting the first optical signal;
    switch from the low power state to a normal operation state based on the generated trigger signal;

operate in the normal operation state for establishing a high-speed optical data link with the end point device;

switch back to the low power state from the normal operation state when there is no active high-speed optical data link with any end point device for a predefined period of time; and wherein the access point dissipates less power in the low power state than in the normal operation state, wherein prior to generating the trigger signal, the access point is further configured to:

negotiate on a setting for the high-speed optical data link with the end point device on the first optical channel upon the detection of the first optical signal;

and wherein the step of generating the trigger signal follows after a setting for the high-speed optical data link is agreed between the access point and the end point device;

and wherein the high-speed optical data link is established on an optical data channel different from the first optical channel.

13. An optical wireless communication network comprising at least one access point of claim 10, and at least one end point device of claim 11.

\* \* \* \* \*